United States Patent
Choi et al.

(10) Patent No.: US 12,497,507 B2
(45) Date of Patent: Dec. 16, 2025

(54) THERMOPLASTIC RESIN COMPOSITION AND MOLDED PRODUCT MANUFACTURED FROM SAME

(71) Applicant: LOTTE CHEMICAL CORPORATION, Seoul (KR)

(72) Inventors: Ki Hong Choi, Uiwang-si (KR); Sung Woo Yang, Uiwang-si (KR); Dong In Ha, Uiwang-si (KR); Tae Gon Kang, Uiwang-si (KR); Dong Yeop Shin, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 757 days.

(21) Appl. No.: 17/760,520

(22) PCT Filed: Jun. 5, 2020

(86) PCT No.: PCT/KR2020/007321
§ 371 (c)(1),
(2) Date: Mar. 15, 2022

(87) PCT Pub. No.: WO2021/060665
PCT Pub. Date: Apr. 1, 2021

(65) Prior Publication Data
US 2022/0356345 A1    Nov. 10, 2022

(30) Foreign Application Priority Data
Sep. 24, 2019  (KR) .................. 10-2019-0117252

(51) Int. Cl.
| | | |
|---|---|---|
| *C08L 69/00* | (2006.01) | |
| *B29C 45/00* | (2006.01) | |
| *C08L 23/0869* | (2025.01) | |
| *C08L 67/02* | (2006.01) | |
| *B29K 23/00* | (2006.01) | |
| *B29K 33/00* | (2006.01) | |
| *B29K 67/00* | (2006.01) | |
| *B29K 69/00* | (2006.01) | |

(52) U.S. Cl.
CPC .......... *C08L 69/00* (2013.01); *B29C 45/0001* (2013.01); *C08L 67/02* (2013.01); *B29K 2023/08* (2013.01); *B29K 2033/08* (2013.01); *B29K 2069/00* (2013.01); *B29K 2995/0016* (2013.01); *C08L 2201/02* (2013.01); *C08L 2205/03* (2013.01)

(58) Field of Classification Search
None
See application file for complete search history.

(56) References Cited

U.S. PATENT DOCUMENTS

| | | |
|---|---|---|
| 6,174,943 B1 | 1/2001 | Matsumoto et al. |
| 2012/0100377 A1 | 4/2012 | Seidel et al. |
| 2013/0172434 A1 | 7/2013 | Park et al. |
| 2014/0357769 A1 | 12/2014 | Zheng et al. |
| 2015/0025163 A1 | 1/2015 | Park et al. |
| 2015/0150822 A1 | 6/2015 | Perumal et al. |
| 2015/0368458 A1 | 12/2015 | Sun et al. |
| 2016/0312025 A1 | 10/2016 | Atkinson et al. |
| 2019/0203041 A1 | 7/2019 | Park et al. |

FOREIGN PATENT DOCUMENTS

| | | |
|---|---|---|
| CN | 105264017 A | 1/2016 |
| CN | 105849192 A | 8/2016 |
| CN | 109988405 A | 7/2019 |
| JP | 2018-095669 A | 6/2018 |
| KR | 10-2011-0059886 A | 6/2011 |
| KR | 10-2011-0078945 A | 7/2011 |
| KR | 10-2013-0094166 A | 8/2013 |
| KR | 10-2015-0049296 A | 5/2015 |
| KR | 10-2016-0016963 A | 2/2016 |
| KR | 10-2019-0081869 A | 7/2019 |
| WO | 2021/060665 A1 | 4/2021 |

OTHER PUBLICATIONS

Office Action in counterpart Chinese Application No. 202080066453.8 dated Mar. 16, 2023, pp. 1-8.
Search Report in counterpart European Application No. 20868275.7 dated Aug. 31, 2023, pp. 1-3.
International Search Report in counterpart International Application No. PCT/KR2020/007321 dated Sep. 15, 2020, pp. 1-6.

*Primary Examiner* — Arrie L Reuther
*Assistant Examiner* — Devin Mitchell Darling
(74) *Attorney, Agent, or Firm* — Additon, Pendleton & Witherspoon, P.A.

(57) ABSTRACT

A thermoplastic resin composition of the present invention comprises: about 100 parts by weight of a polycarbonate resin; about 10 to about 40 parts by weight of a polyester resin; about 0.1 to about 1.0 parts by weight of a chain extender; about 50 to about 80 parts by weight of glass fibers; about 10 to about 25 parts by weight of a phosphorus flame retardant; and about 1 to about 7 parts by weight of a modified polyolefin, wherein the weight ratio of the polyester resin and the chain extender is about 1:0.01 to about 1:0.06. The thermoplastic resin composition is excellent in dimensional stability, flame retardancy, impact resistance, and the like.

7 Claims, No Drawings

THERMOPLASTIC RESIN COMPOSITION AND MOLDED PRODUCT MANUFACTURED FROM SAME

CROSS-REFERENCE TO RELATED APPLICATIONS

This application claims priority to and the benefit of International Application No. PCT/KR2020/007321, filed Jun. 5, 2020, which published as WO 2021/060665 on Apr. 1, 2021, and Korean Patent Application No. 10-2019-0117252, filed in the Korean Intellectual Property Office on Sep. 24, 2019, the entire disclosure of each of which is incorporated herein by reference.

TECHNICAL FIELD

The present invention relates to a thermoplastic resin composition and a molded product produced therefrom. More particularly, the present invention relates to a thermoplastic resin composition that exhibits good properties in terms of dimensional stability, flame retardancy, impact resistance, and the like, and a molded product produced therefrom.

BACKGROUND ART

As engineering plastics, polycarbonate resins have good properties in terms of impact resistance, heat resistance, dimensional stability, weather resistance, flame retardancy, electrical properties, transparency and the like, and are usefully applied to housings of electric/electronic products, interior/exterior materials of office equipment, and the like. In addition, various fillers are used to improve various properties of the polycarbonate resins.

However, fillers, such as glass fiber, talc, and wollastonite, which are applied to improve dimensional stability of the polycarbonate resins, have different physical properties depending on the kind of fillers and can cause deterioration in properties when added in a certain amount or more, thereby making it difficult to realize metal-level dimensional stability.

Therefore, there is a need for development of a thermoplastic resin composition that can realize metal-level dimensional stability and exhibits good properties in terms of flame retardancy, impact resistance, and the like.

The background technique of the present invention is disclosed in Korean Patent Laid-open Publication No. 10-2011-0059886 and the like.

DISCLOSURE

Technical Problem

It is an aspect of the present invention to provide a thermoplastic resin composition that exhibits good properties in terms of dimensional stability, flame retardancy, impact resistance, and the like.

It is another aspect of the present invention to provide a molded product produced from the thermoplastic resin composition.

The above and other aspects of the present invention can be achieved by the present invention described below.

Technical Solution

1. One aspect of the present invention relates to a thermoplastic resin composition. The thermoplastic resin composition comprises: about 100 parts by weight of a polycarbonate resin; about 10 parts by weight to about 40 parts by weight of a polyester resin; about 0.1 parts by weight to about 1 part by weight of a chain extender; about 50 parts by weight to about 80 parts by weight of glass fibers; about 10 parts by weight to about 25 parts by weight of a phosphorus flame retardant; and about 1 part by weight to about 7 parts by weight of a modified polyolefin, wherein the polyester resin and the chain extender are present in a weight ratio of about 1:0.01 to about 1:0.06.

2. In embodiment 1, the polyester resin may comprise at least one of polyethylene terephthalate, polybutylene terephthalate, polyethylene naphthalate, polytrimethylene terephthalate, and polycyclohexylene terephthalate.

3. In embodiment 1 or 2, the polyester resin may comprise at least one of polyethylene terephthalate and polybutylene terephthalate.

4. In embodiments 1 to 3, the chain extender may comprise at least one of a composite of an aromatic diol compound and epichlorohydrin, and a modified acrylic copolymer.

5. In embodiments 1 to 4, the modified polyolefin may comprise at least one of ethylene-methyl acrylate copolymer (EMA), ethylene-ethyl acrylate copolymer (EEA), and ethylene-butyl acrylate (EBA).

6. In embodiments 1 to 5, the polyester resin and the glass fibers may be present in a weight ratio of about 1:1 to about 1:8.

7. In embodiments 1 to 6, the polyester resin and the glass fibers may be fed through a side feeder in preparation of the thermoplastic resin composition.

8. In embodiments 1 to 7, the thermoplastic resin composition may have a coefficient of linear expansion of about 20 μm/m·° C. to about 30 μm/m·° C., as measured on an injection-molded specimen having a size of 10 mm×10 mm×6.4 mm while heating the specimen from 0° C. to 80° C. at 5° C./min in accordance with ASTM D696.

9. In embodiments 1 to 8, the thermoplastic resin composition may have a flame retardancy of V-0, as measured on a 0.8 mm thick specimen by a UL-94 vertical test method.

10. In embodiments 1 to 9, the thermoplastic resin composition may have a notched Izod impact strength of about 10 kgf·cm/cm to about 15 kgf·cm/cm, as measured on a ⅛" thick notched Izod specimen in accordance with ASTM D256.

11. Another aspect of the present invention relates to a molded product. The molded product is produced from the thermoplastic resin composition according to any one of embodiments 1 to 10.

Advantageous Effects

The present invention provides a thermoplastic resin composition that has good properties in terms of dimensional stability, flame retardancy, impact resistance, and the like, and a molded product produced therefrom.

BEST MODE

Hereinafter, embodiments of the present invention will be described in detail.

A thermoplastic resin composition according to the present invention comprises: (A) a polycarbonate resin; (B) a polyester resin; (C) a chain extender; (D) glass fibers; (E) a phosphorus flame retardant; and (F) a modified polyolefin.

As used herein to represent a specific numerical range, the expression "a to b" means "≥a and ≤b".

(A) Polycarbonate Resin

The polycarbonate resin according to one embodiment of the present invention may comprise any polycarbonate resin used in typical thermoplastic resin compositions. For example, the polycarbonate resin may be an aromatic polycarbonate resin prepared by reacting diphenols (aromatic diol compounds) with a precursor, such as phosgene, halogen formate, or carbonate diester.

In some embodiments, the diphenols may comprise, for example, 4,4'-biphenol, 2,2-bis(4-hydroxyphenyl)propane, 2,4-bis(4-hydroxyphenyl)-2-methylbutane, 1,1-bis(4-hydroxyphenyl)cyclohexane, 2,2-bis(3-chloro-4-hydroxyphenyl)propane, and 2,2-bis-(3,5-dichloro-4-hydroxyphenyl) propane, without being limited thereto. For example, the diphenols may be 2,2-bis(4-hydroxyphenyl)propane, 2,2-bis (3,5-dichloro-4-hydroxyphenyl)propane, 2,2-bis(3-methyl-4-hydroxyphenyl)propane, or 1,1-bis(4-hydroxyphenyl)cyclohexane, specifically 2,2-bis(4-hydroxyphenyl)propane, which is also referred to as bisphenol-A.

In some embodiments, the polycarbonate resin may be a branched polycarbonate resin. For example, the polycarbonate resin may be a polycarbonate resin prepared by adding a tri- or higher polyfunctional compound, specifically, a tri- or higher valent phenol group-containing compound, in an amount of about 0.05 mol % to about 2 mol % based on the total number of moles of the diphenols used in polymerization.

In some embodiments, the polycarbonate resin may be a homopolycarbonate resin, a copolycarbonate resin, or a blend thereof. In addition, the polycarbonate resin may be partly or completely replaced by an aromatic polyestercarbonate resin obtained by polymerization in the presence of an ester precursor, for example, a bifunctional carboxylic acid.

In some embodiments, the polycarbonate resin may have a weight average molecular weight (Mw) of about 10,000 g/mol to about 200,000 g/mol, for example, about 15,000 g/mol to about 80,000 g/mol, as measured by gel permeation chromatography (GPC). Within this range, the thermoplastic resin composition can have good fluidity (processability).

(B) Polyester Resin

According to the present invention, the polyester resin serves to realize metal-level dimensional stability of the thermoplastic resin composition together with the chain extender, the glass fibers, and the like without deterioration in other properties, such as flame retardancy, impact resistance, and the like, and may be selected from any polyester resins used in a typical thermoplastic resin composition. For example, the polyester resin may be obtained by polycondensation of a dicarboxylic acid component and a diol component, in which the dicarboxylic acid component may comprise: aromatic dicarboxylic acids, such as terephthalic acid (TPA), isophthalic acid (IPA), 1,2-naphthalene dicarboxylic acid, 1,4-naphthalene dicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid, 2,7-naphthalenedicarboxylic acid, and the like; and aromatic dicarboxylates, such as dimethyl terephthalate (DMT), dimethyl isophthalate, dimethyl-1,2-naphthalate, dimethyl-1,5-naphthalate, dimethyl-1,7-naphthalate, dimethyl-1,7-naphthalate, dimethyl-1,8-naphthalate, dimethyl-2,3-naphthalate, dimethyl-2,6-naphthalate, dimethyl-2,7-naphthalate, and the like, and in which the diol component may comprise ethylene glycol, 1,2-propylene glycol, 1,3-propylene glycol, 2,2-dimethyl-1,3-propanediol, 1,3-butanediol, 1,4-butanediol, 1,5-pentanediol, 1,5-pentanediol, 1,6-hexanediol, and a cycloalkylene diol.

In some embodiments, the polyester resin may comprise polyethylene terephthalate (PET), polybutylene terephthalate (PBT), polyethylene naphthalate (PEN), polytrimethylene terephthalate (PTT), polycyclohexylene terephthalate, and combinations thereof. For example, the polyester resin may be polyethylene terephthalate, polybutylene terephthalate, or a combination thereof.

In some embodiments, the polyester resin may have an inherent viscosity of about 0.6 dl/g to about 1.0 dl/g, as measured using an o-chloro phenol solution (concentration: 0.5 g/dl) at 25° C. using an Ubbelohde viscometer (capillary viscometer). Within this range, the thermoplastic resin composition can exhibit good processability, dimensional stability, and the like.

In some embodiments, the polyester resin may be present in an amount of about 10 parts by weight to about 40 parts by weight, for example, about 10 parts by weight to about 30 parts by weight, relative to about 100 parts by weight of the polycarbonate resin. If the content of the polyester resin is less than about 10 parts by weight relative to about 100 parts by weight of the polycarbonate resin, the thermoplastic resin composition can suffer from deterioration in dimensional stability and the like, and if the content of the polyester resin exceeds about 40 parts by weight, the thermoplastic resin composition can suffer from deterioration in flame retardancy, impact resistance, and the like.

(C) Chain Extender

According to the present invention, the chain extender serves to improve impact resistance, flame retardancy and dimensional stability of the thermoplastic resin composition together with the polyester resin and may comprise at least one of a composite (phenoxy resin) of an aromatic diol compound and epichlorohydrin, and a modified acrylic copolymer.

In some embodiments, the compound of the aromatic diol compound and epichlorohydrin may comprise bisphenol A-type epoxy resin (phenol, 4,4'-(1-methylethylidene)bis-, polymer with 2-(chloromethyl)oxirane), which is a compound of bisphenol A and epichlorohydrin.

In some embodiments, the modified acrylic copolymer may be an acrylic copolymer having an epoxy group.

In some embodiments, the chain extender may have a weight average molecular weight (Mw) of about 5,000 g/mol to about 60,000 g/mol, for example, about 6,500 g/mol to about 55,000 g/mol, as measured by GPC (gel permeation chromatography). Within this range, the thermoplastic resin composition can exhibit good properties in terms of impact resistance, dimensional stability, and the like.

In some embodiments, the chain extender may be present in an amount of about 0.1 parts by weight to about 1 part by weight, for example, about 0.3 parts by weight to about 0.8 parts by weight. If the content of the chain extender is less than about 0.1 parts by weight relative to about 100 parts by weight of the polycarbonate resin, the thermoplastic resin composition can suffer from deterioration in impact resistance, dimensional stability, and the like, and if the content of the chain extender exceeds about 1 part by weight, the thermoplastic resin composition can suffer from deterioration in fluidity, flame retardancy, and the like.

In some embodiments, the polyester resin (B) and the chain extender (C) may be present in a weight ratio (B:C) of about 1:0.01 to about 1:0.06, for example, about 1:0.01 to about 1:0.04. If the weight ratio of the polyester resin to the chain extender is less than about 1:0.01, the thermoplastic resin composition can suffer from deterioration in dimensional stability, impact resistance, and the like, and if the weight ratio thereof exceeds about 1:0.06, the thermoplastic resin composition can suffer from deterioration in fluidity, flame retardancy, and the like.

(D) Glass Fibers

According to the present invention, the glass fibers serve to realize metal-level dimensional stability of the thermoplastic resin composition together with the polyester resin, the chain extender, and the like without deterioration in other properties, such as flame retardancy, impact resistance, and the like, and may be selected from glass fibers used in a typical thermoplastic resin composition.

In some embodiments, the glass fibers may have a fibrous shape and may have various cross-sectional shapes, such as circular, elliptical, and rectangular shapes. For example, fibrous glass fibers having circular and/or rectangular cross-sectional shapes may be preferred in terms of mechanical properties.

In some embodiments, the glass fibers having a circular cross-section may have a cross-sectional diameter of about 5 μm to about 20 μm and a pre-processing length of about 2 nm to about 20 mm, and the glass fibers having a rectangular cross-section may have an aspect ratio (a ratio of a long-side length to a short-side length in a cross-section of the glass fiber) of about 1.5 to about 10, a short-side length of about 2 μm to about 10 μm, and a pre-processing length of about 2 mm to about 20 mm. Within this range, the thermoplastic resin composition can have good properties in terms of dimensional stability, rigidity and processability.

In some embodiments, the glass fibers may be subjected to surface treatment with a typical surface treatment agent.

In some embodiments, the glass fibers may be present in an amount of about 50 parts by weight to about 80 parts by weight, for example, about 60 parts by weight to about 70 parts by weight, relative to about 100 parts by weight of the polycarbonate resin. If the content of the glass fibers is less than about 50 parts by weight relative to about 100 parts by weight of the polycarbonate resin, the thermoplastic resin composition can suffer from deterioration in dimensional stability and the like, and if the content of the glass fibers exceeds about 80 parts by weight, the thermoplastic resin composition can suffer from deterioration in impact resistance, flame retardancy, and the like.

In some embodiments, the polyester resin (B) and the glass fibers (D) may be present in a weight ratio (B:D) of about 1:1 to about 1:8, for example, about 1:2 to about 1:6. Within this range, the thermoplastic resin composition can exhibit good properties in terms of dimensional stability, impact resistance, and the like.

(E) Phosphorus Flame Retardant

According to the present invention, the phosphorus flame retardant serves to improve flame retardancy and the like of the thermoplastic resin composition and may be a phosphorus flame retardant used in typical flame retardant thermoplastic resin compositions. For example, the phosphorus flame retardant may comprise a phosphate compound, a phosphonate compound, a phosphinate compound, a phosphine oxide compound, a phosphazene compound, and metal salts thereof. These compounds may be used alone or as a mixture thereof.

In some embodiments, the phosphorus flame retardant may comprise a phosphazene compound represented by Formula 1.

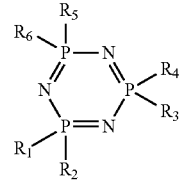

[Formula 1]

where $R_1$, $R_2$, $R_3$, $R_4$, $R_5$ and $R_6$ are each independently a hydrogen atom, a halogen atom, a substituted or unsubstituted C1 to C20 alkyl group, a substituted or unsubstituted $C_2$ to $C_7$ alkenyl group, a substituted or unsubstituted $C_3$ to $C_{20}$ cycloalkyl group, a substituted or unsubstituted $C_2$ to $C_{20}$ heterocycloalkyl group, a $C_1$ to $C_{20}$ alkoxy group, a $C_6$ to $C_{20}$ aryl group or aryloxy group, a $C_5$ to $C_{20}$ heteroaryl group, a substituted or unsubstituted $C_3$ to $C_{20}$ alkoxy carbonyl alkyl group, a substituted or unsubstituted $C_2$ to $C_{10}$ carbonyl alkyl group, an amino group, or a hydroxyl group.

Here, "substituted" means that a hydrogen atom is substituted with a substituent, for example, a C1 to C10 alkyl group, a halogen atom, a nitro group, a cyano group, a hydroxyl group, an amino group, a $C_6$ to $C_{10}$ aryl group, a $C_3$ to $C_{10}$ cycloalkyl group, a $C_3$ to $C_{10}$ heterocycloalkyl group, a $C_4$ to $C_{10}$ heteroaryl group, and combinations thereof.

In addition, "alkyl", "alkoxy" and other substituents containing an "alkyl" moiety comprise linear or branched structures, and "alkenyl" comprises linear or branched structures having 2 to 8 carbon atoms and containing at least one double bond. In addition, "cycloalkyl" comprises saturated monocyclic or saturated bicyclic structures having 3 to 20 carbon atoms. Further, "aryl" is an organic radical derived from an aromatic hydrocarbon through removal of one hydrogen atom therefrom and comprises single or fused ring systems containing suitably 4 to 7, preferably 5 or 6 atoms in each ring. Specifically, "aryl" may comprise phenyl, naphthyl, biphenyl, tolyl, and the like.

Here, "heterocycloalkyl" means a cycloalkyl group containing 1 to 3 heteroatoms selected from N, O, and S as saturated cyclic hydrocarbon backbone atoms, in which the remaining saturated monocyclic or bicyclic ring backbone atoms are carbon atoms, and may comprise pyrrolidinyl, azetidinyl, pyrazolidinyl, oxazolidinyl, piperidinyl, piperazinyl, morpholinyl, thiomorpholinyl, thiazolidinyl, hydantoinyl, valerolactamyl, oxylanyl, oxetanyl, dioxolanyl, dioxanyl, oxathiolanyl, oxathianyl, dithianyl, dihydrofuranyl, tetrahydrofuranyl, dihydropyranyl, tetrahydropyranyl, tetrahydropyridinyl, tetrahydropyrimidinyl, tetrahydrothiophenyl, tetrahydrothiopyranyl, diazepanyl, azepanyl, and the like.

In addition, "heteroaryl" means an aryl group containing 1 to 3 heteroatoms selected from N, O, and S as aromatic ring backbone atoms, in which the remaining ring backbone atoms are carbon atoms. The heteroaryl group may comprise a divalent aryl group in which a heteroatom in the ring is oxidized or quaternized to form, for example, an N-oxide or a quaternary salt. Specifically, the heteroaryl group may comprise furyl, thiophenyl, pyrrolyl, pyranyl, imidazolyl, pyrazolyl, thiazolyl, thiadiazolyl, isothiazolyl, isoxazolyl, oxazolyl, oxadiazolyl, triazinyl, tetrazinyl, triazolyl, tetrazolyl, furazanyl, pyridyl, pyrazinyl, pyrimidinyl, pyridazinyl, and the like.

In some embodiments, the phosphorus flame retardant may be present in an amount of about 10 parts by weight to about 25 parts by weight, for example, about 15 parts by weight to about 20 parts by weight, relative to about 100 parts by weight of the polycarbonate resin. If the content of the phosphorus flame retardant is less than about 10 parts by weight relative to about 100 parts by weight of the polycarbonate resin, the thermoplastic resin composition can suffer from deterioration in flame retardancy, fluidity, and the like, and if the content of the phosphorus flame retardant exceeds about 25 parts by weight, the thermoplastic resin composition can suffer from deterioration in impact resistance, dimensional stability, and the like.

(F) Modified Polyolefin

According to the present invention, the modified polyolefin serves to improve impact resistance of the thermoplastic resin composition.

In some embodiments, the modified polyolefin may comprise ethylene-methyl acrylate copolymer (EMA), ethylene-ethyl acrylate copolymer (EEA), ethylene-butyl acrylate copolymer (EBA), and the like.

In some embodiments, the modified polyolefin may be provided in the form of a random copolymer, a block copolymer, a multi-block copolymer, or a combination thereof.

In some embodiments, the modified polyolefin may have a melt-flow index of about 0.01 g/10 min to about 40 g/10 min, for example, about 0.1 g/10 min to about 10 g/10 min, as measured under conditions of 190° C. and 2.16 kgf in accordance with ASTM D1238. Within this range, the thermoplastic resin composition can have good impact resistance and the like.

In some embodiments, the modified polyolefin may be present in an amount of about 1 part by weight to about 7 parts by weight, for example, about 2 parts by weight to about 5 parts by weight, relative to about 100 parts by weight of the polycarbonate resin. If the content of the modified polyolefin is less than about 1 part by weight relative to about 100 parts by weight of the polycarbonate resin, the thermoplastic resin composition can suffer from deterioration in impact resistance and the like, and if the content of the modified polyolefin exceeds about 7 parts by weight, the thermoplastic resin composition can suffer from deterioration in dimensional stability, flame retardancy, and the like.

In some embodiments, the thermoplastic resin composition may further comprise additives used for typical thermoplastic resin compositions. Examples of the additives may comprise antioxidants, anti-dripping agents, lubricants, release agents, nucleating agents, antistatic agents, stabilizers, pigments, dyes, and mixtures thereof, without being limited thereto. The additives may be present in an amount of about 0.001 parts by weight to about 40 parts by weight, for example, about 0.1 parts by weight to about 10 parts by weight, relative to about 100 parts by weight of the polycarbonate resin.

In some embodiments, the thermoplastic resin composition may be prepared in pellet form by mixing the aforementioned components, followed by melt extrusion at about 200° C. to about 280° C., for example, about 220° C. to about 270° C., using a typical twin-screw extruder.

In some embodiments, the polyester resin and the glass fibers may be fed through a side feeder in preparation (mixing) of the thermoplastic resin composition. As a result, the thermoplastic resin composition has good dimensional stability.

In some embodiments, the thermoplastic resin composition may have a coefficient of linear expansion of about 20 μm/m·° C. to about 30 μm/m·° C., for example, about 25 μm/m·° C. to about 30 μm/m·° C., as measured on an injection-molded specimen having a size of 10 mm×10 mm×6.4 mm while heating the specimen from 0° C. to 80° C. at 5° C./min using a thermo-mechanical analyzer in accordance with ASTM D696.

In some embodiments, the thermoplastic resin composition may have a flame retardancy of V-0, as measured on a 0.8 mm thick injection-molded specimen by a UL-94 50W vertical test method.

In some embodiments, the thermoplastic resin composition may have a notched Izod impact strength of about 9 kgf·cm/cm to about 15 kgf·cm/cm, for example, about 10 kgf·cm/cm to about 14 kgf·cm/cm, as measured on a ⅛" thick specimen in accordance with ASTM D256.

A molded product according to the present invention is produced from the thermoplastic resin composition set forth above. The thermoplastic resin composition may be prepared in pellet form. The prepared pellets may be produced into various molded products by various molding methods, such as injection molding, extrusion molding, vacuum molding, and casting. These molding methods are well known to those skilled in the art. The molded product has good properties in terms of dimensional stability, flame retardancy, impact resistance, and balance therebetween, and thus can be advantageously used for interior/exterior materials for electrical/electronic products, thin sheets, and the like.

MODE FOR INVENTION

Next, the present invention will be described in more detail with reference to some examples. It should be understood that these examples are provided for illustration only and are not to be construed in any way as limiting the invention.

EXAMPLE

Details of components used in Examples and Comparative Examples are as follows.

(A) Polycarbonate Resin

A bisphenol-A polycarbonate resin having a weight average molecular weight (Mw) of 25,000 g/mol was used.

(B) Polyester Resin (B1) Polyethylene terephthalate (PET, Manufacturer: SK Chemical, Product Name: SKYPET 1100, Inherent viscosity: 0.77 dl/g) was used.
(B2) Polybutylene terephthalate (PBT, Manufacturer: Shinkong, Product Name: Shinite K006, Inherent viscosity: 1 dl/g) was used.

(C) Chain Extender (C1) A bisphenol A-type epoxy resin (Phenol, 4,4'-(1-methylethylidene)bis-, polymer with 2-(chloromethyl)oxirane, Manufacturer: InChemRez, Product Name: PKHH) was used.

(C2) An epoxy group-containing acrylic copolymer (Manufacturer: BASF, Product Name: ADR-4370S) was used.

(D) Inorganic Filler (D1) Glass fibers (Manufacturer: KCC, Product Name: CS321-EC10-3)

(D2) Talc (Manufacturer: KOCH, Product Name: KCP-04)

(E) Phosphorus Flame Retardant

A phosphazene compound (Manufacturer: Fushimi Pharmaceutical, Product Name: FP-110) was used.

(F) Impact Modifier (F1) An ethylene-methyl acrylate copolymer (EMA, Manufacturer: Dupont, Product Name: Elvaroy AC 1330) was used.

(F2) MBS (Manufacturer: Mitsubishi chemical, Product Name: C-223A)

Examples 1 to 7 and Comparative Examples 1 to 13

The above components were mixed in amounts as listed in Tables 1 and 2 and subjected to extrusion under conditions of 260° C., thereby preparing a thermoplastic resin composition in pellet form. Here, components other than the polyester resin and the glass fibers were fed to a main feeder and the polyester resin and the glass fibers were fed to a side feeder. Extrusion was performed using a twin-screw extruder (L/D=36, Φ: 45 mm) and the prepared pellets were dried at 80° C. for 4 hours or more and injection-molded in a 6 oz. injection molding machine (molding temperature: 260° C., mold temperature: 60° C.), thereby preparing specimens. The prepared specimens were evaluated as to the following properties by the following method, and results are shown in Tables 1 and 2.

Property Measurement (1) Dimensional stability: Coefficient of linear expansion (unit: μm/m·° C.) was measured on an injection-molded specimen having a size of 10 mm×10 mm×6.4 mm while heating the specimen from 0° C. to 80° C. at 5° C./min using a thermo-mechanical analyzer in accordance with ASTM D696.

(2) Flame retardancy: Flame retardancy was measured on a 0.8 mm thick injection-molded specimen by a UL-94 vertical test method.

(3) Impact resistance: Notched Izod impact strength (kgf·cm/cm) was measured on a ⅛" thick specimen in accordance with ASTM D256.

TABLE 1

|  | Example | | | | | | |
|---|---|---|---|---|---|---|---|
|  | 1 | 2 | 3 | 4 | 5 | 6 | 7 |
| (A) (parts by weight) | 100 | 100 | 100 | 100 | 100 | 100 | 100 |
| (B1) (parts by weight) | 13 | 20 | 25 | — | 20 | 20 | 20 |
| (B2) (parts by weight) | — | — | — | 20 | — | — | — |
| (C1) (parts by weight) | 0.5 | 0.5 | 0.5 | 0.5 | 0.3 | 0.8 | — |
| (C2) (parts by weight) | — | — | — | — | — | — | 0.5 |
| (D1) (parts by weight) | 67 | 67 | 67 | 67 | 67 | 67 | 67 |
| (D2) (parts by weight) | — | — | — | — | — | — | — |
| (E) (parts by weight) | 17 | 17 | 17 | 17 | 17 | 17 | 17 |
| (F1) (parts by weight) | 3 | 3 | 3 | 3 | 3 | 3 | 3 |
| (F2) (parts by weight) | — | — | — | — | — | — | — |
| Dimensional stability | 28 | 25 | 27 | 27 | 29 | 26 | 24 |
| Flame retardancy | V-0 | V-0 | V-0 | V-0 | V-0 | V-0 | V-0 |
| Impact resistance | 12.9 | 11.5 | 10.2 | 10.6 | 10.1 | 13.2 | 11.7 |

TABLE 2

|  | Comparative Example | | | | | | |
|---|---|---|---|---|---|---|---|
|  | 1 | 2 | 3 | 4 | 5 | 6 | 7 |
| (A) (parts by weight) | 100 | 100 | 100 | 100 | 100 | 100 | 100 |
| (B1) (parts by weight) | 8 | 32 | 20 | 20 | 20 | 25 | 15 |
| (B2) (parts by weight) | — | — | — | — | — | — | — |
| (C1) (parts by weight) | 0.5 | 0.5 | 0.08 | 1.2 | — | 0.2 | 1 |
| (C2) (parts by weight) | — | — | — | — | — | — | — |
| (D1) (parts by weight) | 67 | 67 | 67 | 67 | 67 | 67 | 67 |
| (D2) (parts by weight) | — | — | — | — | — | — | — |
| (E) (parts by weight) | 17 | 17 | 17 | 17 | 17 | 17 | 17 |
| (F1) (parts by weight) | 3 | 3 | 3 | 3 | 3 | 3 | 3 |
| (F2) (parts by weight) | — | — | — | — | — | — | — |
| Dimensional stability | 35 | 37 | 32 | 29 | 31 | 32 | 34 |
| Flame retardancy | V-0 | V-1 | V-0 | V-1 | V-0 | V-0 | V-1 |
| Impact resistance | 12.9 | 8.6 | 9.2 | 10.1 | 7.5 | 10.6 | 9.8 |

TABLE 3

| | Comparative Example | | | | | |
|---|---|---|---|---|---|---|
| | 8 | 9 | 10 | 11 | 12 | 13 |
| (A) (parts by weight) | 100 | 100 | 100 | 100 | 100 | 100 |
| (B1) (parts by weight) | 20 | 20 | 20 | 20 | 20 | 20 |
| (B2) (parts by weight) | — | — | — | — | — | — |
| (C1) (parts by weight) | 0.5 | 0.5 | 0.5 | 0.5 | 0.5 | 0.5 |
| (C2) (parts by weight) | — | — | — | — | — | — |
| (D1) (parts by weight) | — | 42 | 83 | 67 | 67 | 67 |
| (D2) (parts by weight) | 67 | — | — | — | — | — |
| (E) (parts by weight) | 17 | 17 | 17 | 8 | 27 | 17 |
| (F1) (parts by weight) | 3 | 3 | 3 | 3 | 3 | — |
| (F2) (parts by weight) | — | — | — | — | — | 3 |
| Dimensional stability | 55 | 39 | 21 | 23 | 34 | 24 |
| Flame retardancy | V-0 | V-0 | V-1 | V-1 | V-0 | V-0 |
| Impact resistance | 5.5 | 14.1 | 8.5 | 13.5 | 9.8 | 7.2 |

From the result, it could be seen that the thermoplastic resin composition according to the present invention had good properties in terms of dimensional stability, flame retardancy, impact resistance, and the like.

Conversely, it could be seen that the thermoplastic resin composition containing an insufficient amount of the polyester resin (Comparative Example 1) exhibited deterioration in dimensional stability and the like; the thermoplastic resin composition containing an excess of the polyester resin (Comparative Example 2) exhibited deterioration in dimensional stability, flame retardancy, impact resistance, and the like; the thermoplastic resin composition containing an insufficient amount of the chain extender (Comparative Example 3) exhibited deterioration in dimensional stability and the like; and the thermoplastic resin composition containing an excess of the chain extender (Comparative Example 4) exhibited deterioration in flame retardancy and the like. It could be seen that the thermoplastic resin composition free from the chain extender (Comparative Example 5) exhibited deterioration in dimensional stability, impact resistance, and the like; the thermoplastic resin composition containing the polyester resin and the chain extender in a weight ratio less than the weight ratio according to the present invention (Comparative Example 6) exhibited deterioration in dimensional stability and the like; and the thermoplastic resin composition containing the polyester resin and the chain extender in a weight ratio exceeding the weight ratio according to the present invention (Comparative Example 7) exhibited deterioration in dimensional stability, flame retardancy, and the like. In addition, it could be seen that the thermoplastic resin composition containing talc instead of the glass fibers (Comparative Example 8) exhibited deterioration in dimensional stability, impact resistance, and the like; the thermoplastic resin composition containing an insufficient amount of the glass fibers (Comparative Example 9) exhibited deterioration in dimensional stability and the like; and the thermoplastic resin composition containing an excess of the glass fibers (Comparative Example 10) exhibited deterioration in flame retardancy, impact resistance, and the like. It could be seen that the thermoplastic resin composition containing an insufficient amount of the phosphorus flame retardant (Comparative Example 11) exhibited deterioration in flame retardancy and the like; the thermoplastic resin composition containing an excess of the phosphorus flame retardant (Comparative Example 12) exhibited deterioration in dimensional stability and the like; and the thermoplastic resin composition containing MBS (F2) instead of the modified polyolefin (F1) (Comparative Example 13) exhibited deterioration in impact resistance and the like.

It should be understood that various modifications, changes, alterations, and equivalent embodiments can be made by those skilled in the art without departing from the spirit and scope of the present invention.

The invention claimed is:

1. A thermoplastic resin composition comprising:
    about 100 parts by weight of a polycarbonate resin;
    about 10 parts by weight to about 40 parts by weight of a polyester resin;
    about 0.1 parts by weight to about 1 part by weight of a chain extender;
    about 50 parts by weight to about 80 parts by weight of glass fibers;
    about 10 parts by weight to about 25 parts by weight of a phosphorus flame retardant; and
    about 1 part by weight to about 7 parts by weight of a modified polyolefin,
    wherein the polyester resin and the chain extender are present in a weight ratio of about 1:0.01 to about 1:0.06; and
    wherein the polyester resin and the glass fibers are present in a weight ratio of about 1:2 to about 1:6,
    wherein the thermoplastic resin composition has a coefficient of linear expansion of about 20 μm/m·° C. to about 30 μm/m·° C., as measured on an injection-molded specimen having a size of 10 mm×10 mm×6.4 mm while heating the specimen from 0° C. to 80° C. at 5° C./min in accordance with ASTM D696; a flame retardancy of V-0, as measured on a 0.8 mm thick injection-molded specimen by a UL-94 vertical test method; and a notched Izod impact strength of 9 kgf·cm/cm to 15 kgf·cm/cm, as measured on a ⅛" thick notched Izod specimen in accordance with ASTM D256.

2. The thermoplastic resin composition according to claim 1, wherein the polyester resin comprises polyethylene terephthalate, polybutylene terephthalate, polyethylene naphthalate, polytrimethylene terephthalate, and/or polycyclohexylene terephthalate.

3. The thermoplastic resin composition according to claim 1, wherein the polyester resin comprises polyethylene terephthalate and/or polybutylene terephthalate.

4. The thermoplastic resin composition according to claim 1, wherein the chain extender comprises a composite of an aromatic diol compound and epichlorohydrin and/or a modified acrylic copolymer.

5. The thermoplastic resin composition according to claim 1, wherein the modified polyolefin comprises ethylene-methyl acrylate copolymer (EMA), ethylene-ethyl acrylate copolymer (EEA), and/or ethylene-butyl acrylate (EBA).

6. The thermoplastic resin composition according to claim 1, wherein the polyester resin and the glass fibers are fed through a side feeder in preparation of the thermoplastic resin composition.

7. A molded product produced from the thermoplastic resin composition according to claim 1.

* * * * *